J. H. STEVENS.
PIPE CONNECTION.
APPLICATION FILED NOV. 15, 1912.
1,201,889.
Patented Oct. 17, 1916.
2 SHEETS—SHEET 1.
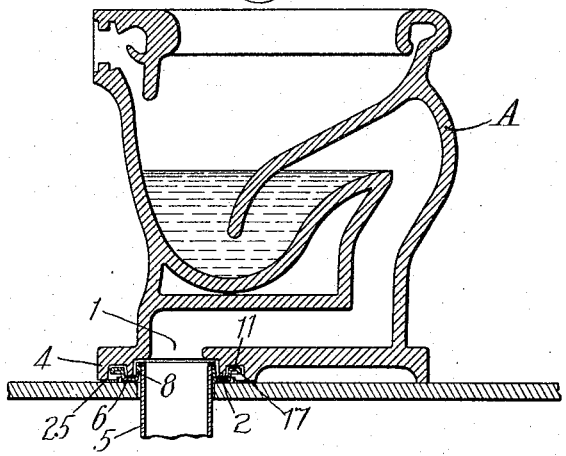
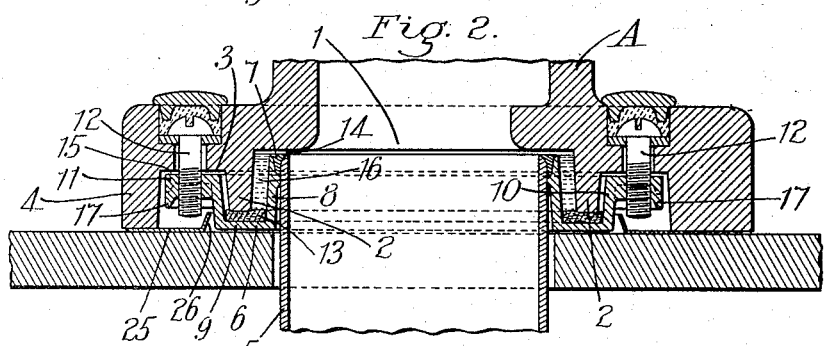
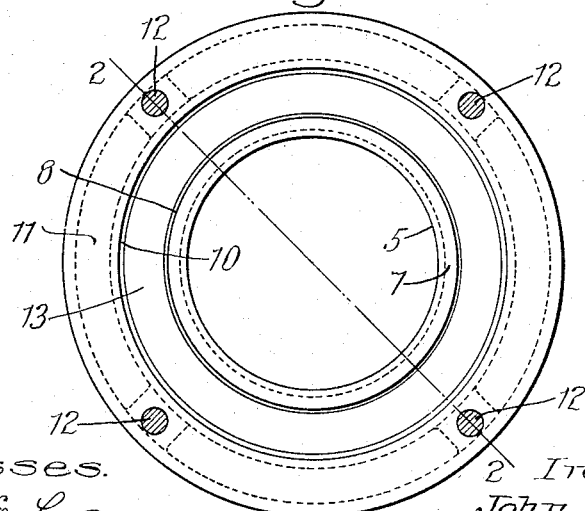
Witnesses.
Franklin E. Low.
Carl L. Choate.
Inventor.
John H. Stevens.
by Emery Booth Janney Varney
Atty's.

J. H. STEVENS.
PIPE CONNECTION.
APPLICATION FILED NOV. 15, 1912.

1,201,889.

Patented Oct. 17, 1916.
2 SHEETS—SHEET 2.

Witnesses.
Franklin E. Low.
Carl L. Choate.

Inventor.
John H. Stevens.
by Emery Booth Janney Varney
Atty's.

UNITED STATES PATENT OFFICE.

JOHN H. STEVENS, OF WINTHROP, MASSACHUSETTS.

PIPE CONNECTION.

1,201,889.  Specification of Letters Patent.  Patented Oct. 17, 1916.

Application filed November 15, 1912. Serial No. 731,552.

*To all whom it may concern:*

Be it known that I, JOHN H. STEVENS, a citizen of the United States, and a resident of Winthrop, in the county of Suffolk and Commonwealth of Massachusetts, have invented an Improvement in Pipe Connections, of which the following description, in connection with the accompanying drawings, is a specification, like characters on the drawings representing like parts.

This invention relates to connections for pipes or conduits for any purpose whatsoever, but largely used in plumbing, steamfitting and the like, and for convenience will be more particularly described with reference to its use in plumbing, but without restricting the invention thereto.

In various connections in plumbing, and particularly in what is known as an outlet connection for water closets, it is important that a perfectly tight connection be had, but practice has demonstrated that it is difficult to obtain such a connection that will be permanent. Accordingly, it is desired to provide a connection which, if a leak occurs, will at once make known the same to observers, in order that prompt attention may be had.

Various attempts have been made to provide a connection that would furnish some sort of a tell-tale, but that alone is not sufficient because if prompt attention is not furnished the leak indicated by the tell-tale is likely to provide an escape for obnoxious gases. Attempts have also been made to provide a connection such that if a leak occurred some form of trap would be provided that would prevent the escape of the harmful or obnoxious gases, but so far as known to me such attempts have never been accompanied by the further attempt to provide a tell-tale that shall indicate the presence of a leak in order that it may receive prompt attention.

My present invention aims to provide a connection which, in the first instance, may be made as tight and as permanent as is possible with such connections, but which at the same time shall furnish a trapped formation to prevent the escape of gases even in the presence of a leak, and to provide further a construction that in addition will furnish the requisite tell-tale to attract such notice as will insure the necessary attention to repair the leak with reasonable promptness.

Figure 4:
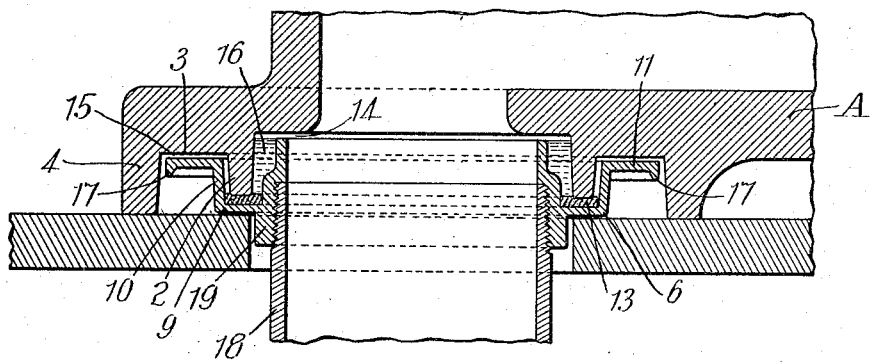
Figure 5:
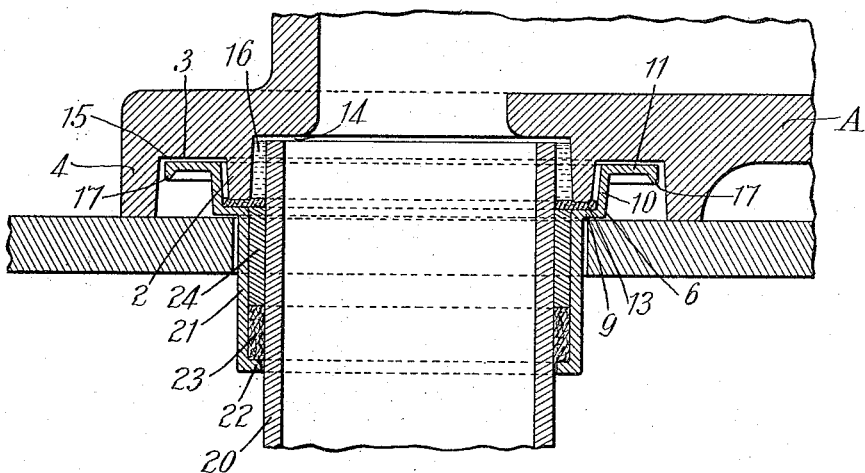

In the accompanying drawings illustrating my invention: Figure 1, in vertical longitudinal section, shows a typical water closet, the outlet of which is provided with a connection made in accordance with one form of my invention; Fig. 2 is a vertical section, on an enlarged scale, showing the connection by itself, with the immediately associated parts, the section being taken on the diagonal dotted line 2—2, Fig. 3; Fig. 3 is a plan view, looking down upon the flanged outlet pipe, Fig. 2, with the closet portion removed; and Figs. 4 and 5 are vertical sections, illustrating modified forms of my invention.

Referring to the drawings, first to the illustrative embodiment thereof shown in Figs. 1 to 3 inclusive, the water closet typical of a bathroom fixture, indicated at A, may be of any desired type or construction and adapted for any use whatsoever, so far as my invention is concerned. The outlet for said closet, indicated at 1, is provided (see Fig. 2) with a depending lip 2, the inner diameter of which is preferably somewhat larger than the diameter of the outlet proper 1. The outer face of said lip is somewhat shorter than its inner face, as indicated, and is surrounded by an annular face 3, which in turn is surrounded by an outer depending base flange 4, adapted to rest upon the floor of the room in which the closet is placed, thus forming an annular inverted recess surrounding said lip 2.

The pipe with which the outlet of the closet A is to be connected is indicated at 5, the same in the present instance being the usual lead pipe which may constitute an inlet end of a usual bend or soil pipe. As is customary in the use of lead inlets of this sort, the same in the present instance is shown as slightly chamfered or beveled at its outer peripheral edge, and is surrounded by a suitable flange 6 secured thereto in usual manner as by solder at 7. This flange 6 is formed to coöperate with the lipped portion of the closet to form a trapped joint, as follows: The flange 6 is formed to present an inner, circumferential wall 8, which stands within the depending lip 2 on the closet and a bottom portion 9 which underlies the bottom of said lip. Outside said lip 2 the flange has a standing portion 10, which reaches nearly but not quite to the overlying portion of the closet, and is there provided with a horizontal annular flange portion 11 which is tapped at the proper points to receive the screws 12 by which the closet and flange are drawn together in the formation of the connection or joint.

Between the bottom of the closet lip 2 and the horizontal portion 9 of the flange is placed a packing ring 13 of suitable material and by means of said screws the said lip and underlying portion of the flange are drawn tightly toward each other upon the interposed packing ring, which is more or less compressed thereby to form a tight joint which is as permanent as is possible with joints of that general character which are now generally employed.

It will be observed that the wall of the outlet 1 for the closet being smaller in diameter than the inner diameter of the soil pipe outlet 5 overhangs the latter but is separated therefrom to leave an annular inlet opening, which I call a tell-tale supply, indicated at 14. It will also be observed that between the outer horizontal flange 11 and the overlying portion of the closet there is a further annular opening, marked 15, and that at both sides the depending closet lip 2 and between the latter and the adjacent upright portions of the flange there are ring-like spaces left.

The first time the closet is flushed or, at any rate, early in the use of the closet, more or less of the water discharged therefrom will be thrown into the annular leakage supply 14, and will fill the annular opening surrounding the inner, upright portion 8 of the flange, and between the latter and the surrounding closet lip 2. The annular space between the upright wall 8 and depending closet lip 2 thus constitutes one form of what I will call a leakage reservoir, marked 16, and remains there undisturbed until such time, if ever, as a leak occurs in the packed joint between the depending lip 2 and the underlying portion 9 of the flange. The moment a leak of sufficient dimensions occurs an outlet will be formed from the leakage reservoir 16, permitting the water to flow therefrom out from under the closet lip 2 into and to fill the larger annular space between said closet lip and the outer upright portion of the flange, and when this outer annular space is filled said liquid will overflow out through the annular leakage space 15, and will discharge downward outside the flange onto the floor, on which it will flow to the outer side of the closet and there indicate by its presence upon the floor that the joint has become defective and commands attention.

If desired, to render it more certain that the tell-tale leakage referred to shall flow outward from under the closet, upon the floor, where it will be exposed to view, rather than by possibility flowing inward to the soil pipe and to follow the latter down through to the floor below, I may employ an annular dam 26 which may be formed as here indicated by inserting beneath the outermost depending flange 4 of the closet a copper or other suitable collar 25, to be held in place thereby, the same having an upturned flange at its inner diameter to underlie the drip edge of the flange portion 11, so that any drip or overflow therefrom will fall outside the upturned portion of the dam and be thereby directed outward and prevented from flowing inward. While it is convenient to form this dam as an upturned lip or flange on the collar referred to, the same may be otherwise formed or held in position if desired.

Upon the occurrence of a leak, and until the tell-tale escape of liquid has attracted attention and the joint has been repaired, a perfectly trapped joint is formed by the presence of the liquid in the concentric annular spaces referred to, which effectually prevents the escape of obnoxious or dangerous gases, even though the leak be unrepaired.

I prefer that the upright portion 8 of the flange immediately surrounding the soil pipe inlet be higher than the outer upright portion of said flange which lies outside the depending closet lip, because by such construction the inner or leakage reservoir 16 is given a greater depth, or as might be correctly stated is given a head, as compared with the water in the outer annular space, which causes the latter to overflow instantly through the annular passage 15 and to escape upon the floor, and where the spaces are properly proportioned this will occur even though no flushing of the closet follow. In any event, the supply will be sufficient to trap the leak, even though not sufficient to overflow at 15 to normally indicate the same without further flushing. Without this head however, any succeeding flushing of the closet, by throwing additional water into the annular leakage supply 14, would furnish the requisite supply to cause the liquid contained in the annular spaces or reservoirs to escape and furnish the requisite tell-tale upon the floor to command attention and repair of the joint.

I have provided the outer periphery of the horizontal portion 11 of the flange with a depending lip 17 to cause any escaping tell-tale water to drop from the periphery of said flange next the inner face of the surrounding flange of the closet down which it will flow and out from under the same upon the floor, to constitute the tell-tale, instead of following the flange itself inward and downward at a point remote from the closet flange 4, where it would be more likely to escape down to the floor immediately surrounding the soil pipe inlet, where it would furnish less specific tell-tale or indication of the leak.

Referring to Fig. 4, the soil pipe inlet is there shown at 18 in the form of a metal pipe, screw-threaded to receive the threaded portion 19 of the flange, which latter is extended upward above and preferably of uniform inside diameter with the inside diameter of said pipe 18, to furnish the required leakage reservoir 16.

In Fig. 5 I have illustrated my invention as adapted to the use of a cast iron soil pipe inlet. In this instance the pipe 21 is not threaded exteriorly as in Fig. 4, but is itself extended to the required level to furnish the leakage reservoir 16. In this instance the flange is provided with a depending neck portion 21, having an inturned lip 22 at its bottom, and is secured to the soil pipe 20 by a joint comprising the hemp or other suitable packing 23, overlying which is the usual lead calking 24.

The drawings illustrate three typical embodiments of my invention, but said invention is not restricted thereto, nor is it restricted to any of the details illustrated, for said invention may be variously embodied without departing from the spirit and scope of the invention.

It is desirable that the inner diameter of the closet outlet 1 be somewhat smaller than the inner diameter of the soil pipe connection 5, to furnish a sort of protection to the tell-tale supply 14 that will prevent solid matter from accidentally lodging therein and obstructing it, but this feature is not absolutely essential. I prefer also that the packing be confined to substantially the point or portion indicated, but should occasion make it seem desirable or necessary said packing might be extended throughout a greater distance along and between the adjoining faces of the coöperating joint forming surfaces of the closet and flange or pipe. Should the leakage reservoir be thereby substantially reduced in volume, or even entirely eliminated, the presence of a leak will be detected and indicated by the water that would be thrown therethrough, and any leakage passage so formed and indicated would, by virtue of the trap formation by and between the coöperating or adjacent faces of the closet and the pipe or flange, furnish the required trap to prevent the escape of gases even while permitting the escape of the tell-tale liquid.

It is, of course, immaterial at what particular point between the adjoining surfaces of the closet and flange or pipe the packing may be located. I have found it advantageous to place the packing where indicated, but it might as well be placed at any other point so long as it would furnish the required packing or dam to prevent normal escape of liquid through the joint. Wherever located between the adjoining surfaces referred to, the trapped effect will be produced to prevent the escape of gases if and when a leakage occurs. Neither is my invention restricted to the use of any particular kind of packing, for any substance or material that will hold its position against the action of the water tending normally to escape through the joint will answer the purpose.

The term pipe connection, used in the claims, is intended to refer to any conduit or conductor to which the invention is applicable.

Claims:

1. A pipe connection comprising opposing members one of which is provided with an annular lip the other provided with an annular recess for and wider than said lip to leave lateral clearance at both sides said lip, packing means normally closing the joint between said members, and an inlet for the clearance at one side said lip and outlet for the clearance at the opposite side thereof, said outlet being at a lower level than said inlet.

2. A pipe connection comprising opposing members one of which is provided with an annular lip the other with an annular recess to receive said lip and wider than the latter to leave a clearance at opposite sides the same, said recessed member having a flange, a tell-tale inlet for the recess at one side said lip, a tell-tale outlet for the recess at the opposite side thereof and above said flange, but at a lower level than said inlet and means coöperating with said flange to draw said members one toward the other.

3. A pipe connection comprising opposing members one of which is provided with an annular lip, and the other with an annular recess to receive said lip, said recess and lip being constructed so that when they are fitted together there will be a chamber or space on each side of said lip, the inside chamber being deeper and of larger capacity than the outer chamber, the recess-containing member being provided with a projecting lip to prevent leakage water from following the outside surface of said member, and means coöperating with said members to draw one toward the other.

In testimony whereof, I have signed my name to this specification, in the presence of two subscribing witnesses.

JOHN H. STEVENS.

Witnesses:
FREDERICK L. EMERY,
ROBERT H. KAMMLER.

Copies of this patent may be obtained for five cents each, by addressing the "Commissioner of Patents, Washington, D. C."